United States Patent [19]

Gancy et al.

[11] 4,021,526

[45] May 3, 1977

[54] SOLUBLE SILICATE REDUCTION IN CALCINED TRONA LIQUORS

[75] Inventors: Alan B. Gancy; Rustom P. Poncha, both of Syracuse, N.Y.

[73] Assignee: Allied Chemical Corporation, Morris Township, N.J.

[22] Filed: June 17, 1975

[21] Appl. No.: 587,585

[52] U.S. Cl. .............................. 423/184; 23/302 T; 423/206 T; 423/421

[51] Int. Cl.² ........................................ C01D 7/00

[58] Field of Search ............ 423/206 T, 184, 421; 23/302 T

[56] References Cited

UNITED STATES PATENTS

| | | | |
|---|---|---|---|
| 3,869,538 | 3/1975 | Sproul et al. | 423/206 T |
| 3,870,780 | 3/1975 | Guptill | 423/206 T |

Primary Examiner—O. R. Vertiz
Assistant Examiner—Wayne A. Langel

Attorney, Agent, or Firm—Gerhard H. Fuchs; Gerard P. Rooney

[57] ABSTRACT

In the process of making sodium carbonate from trona by the method involving crushing the trona, calcining it and dissolving it in an aqueous medium for purification by crystallization, soluble silicate contamination of the crystallization liquor is reduced by an improvement which involves: (a) segregating the calcined trona into a coarse and a fine fraction; (b) separately dissolving the coarse and fine fractions to obtain aqueous solutions of sodium carbonate, sodium silicates and insoluble impurities; (c) optionally adding to the solution of the fine fraction insoluble impurities which have been separated from a solution of such fine fraction in a previous operation; followed by (d) digesting the solution of the fine fraction containing added insolubles at elevated temperature to insolubilize soluble silicates and separating the digested solution from insoluble impurities.

17 Claims, 1 Drawing Figure

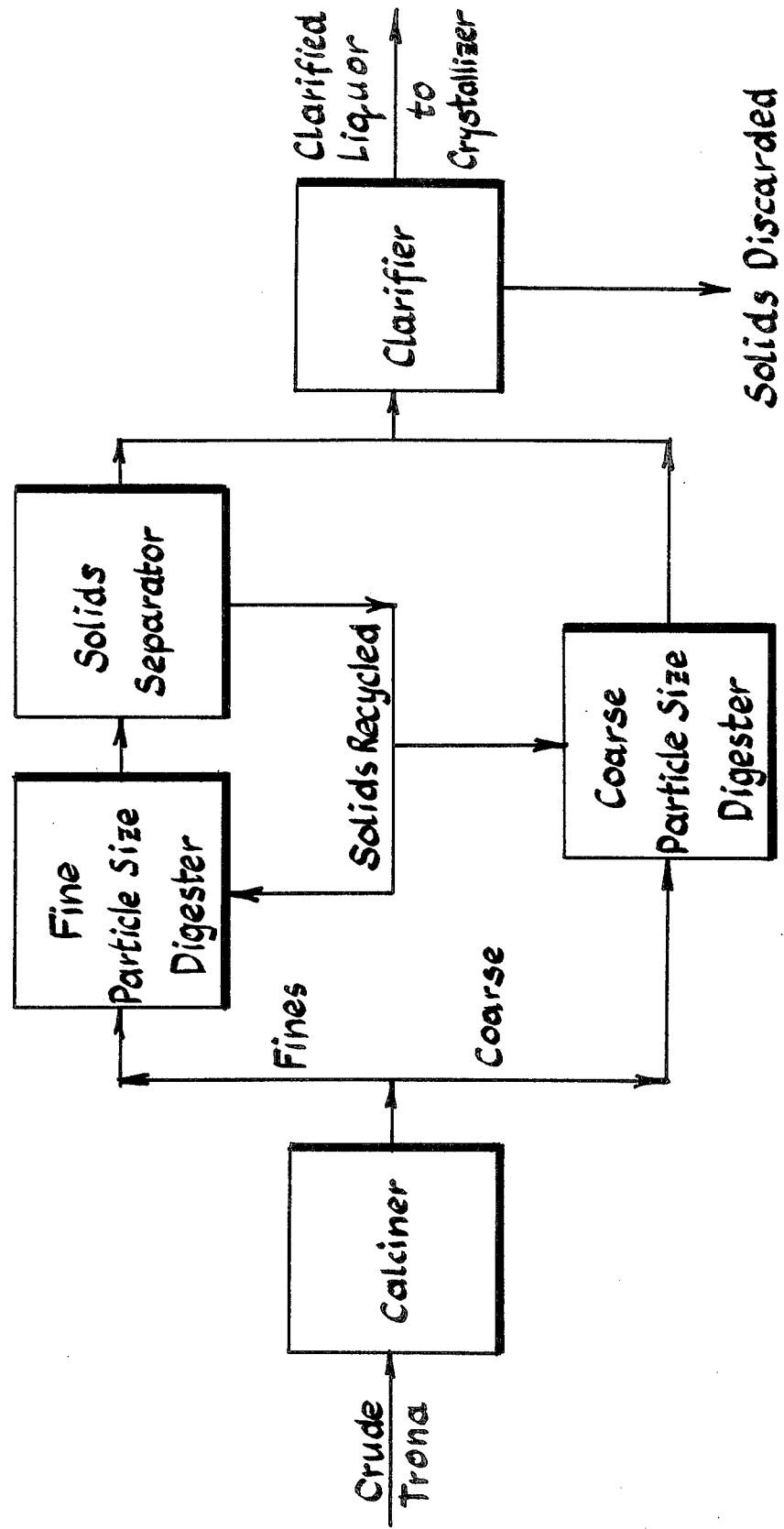

SOLUBLE SILICATE REDUCTION IN CALCINED TRONA LIQUORS

BACKGROUND OF THE INVENTION

Trona deposits in Sweetwater and adjacent counties in Wyoming are found at depths of about 1500 feet underground and consist of a main trona bed varying from 8 to 10 feet in thickness. The trona consist mainly of sodium sesquicarbonate ($Na_2CO_3.NaHCO_3.2H_2O$) containing about 3 to 15%, or, more generally, 5 to 10% of insoluble impurities, mainly shale.

A typical natural trona composition is given below:

| | |
|---|---|
| $Na_2CO_3$ | 41.8% |
| $NaHCO_3$ | 33.1% |
| $H_2O$ | 14.1% |
| | 89.0% |
| Insolubles: | |
| Dolomite $MgCO_3 . CaCO_3$ | 5.5% |
| Quartz $SiO_2$ | 1.1% |
| Feldspar $(K, Na)_2 O . xAl_2O_3 . ySiO_2zH_2O$ | 3.3% |
| Clay $2K_2O . 3MgO . 8Fe_2O_3 . 24SiO_2 . 12H_2O$ | 0.6% |
| Shortite $Na_2CO_3 . 2CaCO_3$ | 0.1% |
| Organic Matter as Elemental Carbon | 0.2% |
| Other (by Difference) | 0.2% |

In the production of sodium carbonate from natural trona, it is usual procedure to calcine the trona at elevated temperature to obtain crude sodium carbonate:

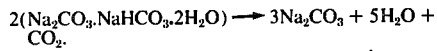

$$2(Na_2CO_3.NaHCO_3.2H_2O) \rightarrow 3Na_2CO_3 + 5H_2O + CO_2.$$

Calcination of the trona effects moisture removal, reduction or elimination of organic matter as well as transformation of the sodium sesquicarbonate to sodium carbonate. However, calcination at elevated temperature also causes sodium carbonate to react with silica contained in the trona to form soluble silicates. The quantity of soluble silicates so formed increases materially with increase in calcination temperature. Soluble silicates are a major impurity in solutions obtained by dissolving calcined trona and, unless steps are taken to reduce soluble silicate content of such solutions, soluble silicates become a significant impurity in soda ash prepared from trona. In the past, levels of soluble silicate in sodium carbonate mother liquors obtained from trona have been controlled or maintained by purging part of the mother liquor. This, of course, entailed loss of valuable soda values. It has also been proposed to reduce soluble silicate levels in aqueous solutions of sodium carbonate obtained by dissolving calcined trona in aqueous media by digesting the solutions at elevated temperature above about 160° F. for time sufficient to substantially reduce the soluble silicates contained therein. Apparently, there is some interaction between the insoluble impurities in the process liquor and the soluble silicates, rendering insoluble or absorbing the soluble silicates to reduce their concentration in the liquor on digestion.

We have now made the unexpected discovery that water-insoluble matter contained in the fine particle size fraction of calcined trona, as compared to water-insoluble matter contained in the coarse particles size fraction, is much more effective in reducing soluble silicates in trona-derived carbonate liquors on digestion at elevated temperature.

SUMMARY OF THE INVENTION

In accordance with the present invention, there is provided an improvement in the process of making sodium carbonate from trona by crushing the trona, calcining the crushed trona, dissolving the calcined trona comprising sodium carbonate, insoluble impurities and soluble silicates in an aqueous medium, followed by separation of insoluble impurities to obtain a sodium carbonate solution, which improvement comprises: (a) segregating the calcined trona into a coarse particle size fraction and a fine particle size fraction; (b) separately dissolving the coarse and the fine particle size fractions in aqueous media to obtain solutions comprising sodium carbonate, soluble silicates and insoluble impurities; (c) optionally adding to the solution of the fine particle size fraction insoluble impurities which have been separated from a solution of fine particle size fraction in a previous operation; and (d) digesting the aqueous sodium carbonate solution obtained from the fine particle size fraction, optionally containing the added insoluble impurities, at temperature above about 160° F. for time sufficient to insolubilize soluble silicates, separating the digested solution from insoluble impurities, and, optionally, returning separated impurities to step (c).

In a preferred embodiment, insoluble impurities which have been separated from a solution of fine particle size fraction in a previous operation are not only added to the solution of the fine particle size fraction, but are also added to the solution of the coarse particle size fraction. Both solutions are then digested at temperature above about 160° F. for time sufficient to insolubilize soluble silicates, followed by separating the digested solutions from insoluble impurities. Insoluble impurities separated from the solution of the coarse particle fraction are discarded; insoluble impurities separated from the solution of the fine particle size fraction are recycled to the digesting step.

DETAILED DESCRIPTION OF THE INVENTION AND OF THE PREFERRED EMBODIMENTS

The drawing is a diagrammatical flow diagram of a preferred embodiment of the process of the present invention.

In the preparation of soda ash from natural trona, the trona is generally first crushed to particle size predominantly smaller than one-half inch average diameter. It is then calcined at temperatures ranging from about 250° to 1500° F., preferably at temperatures between about 250° and 400° F., more preferably about 300° to 360° F., because within the latter temperature ranges solubilization of silica to form soluble silicates is minimized. At temperatures in excess of about 1500° F. the impure sodium carbonate may begin to sinter.

During the calcination operation, which is usually conducted in direct fired rotary furnaces, further particle size reduction takes place. Substantial amounts of dust and fines are generated in that operation. Usually, in the order of about 20 to 30% by weight of the total calcined trona become entrained in the gases vented from the calciner and must be collected in suitable dust separators in order to prevent their escape into the atmosphere.

In usual operation, the coarse calcined trona discharged from the calciner as well as the dust carried in the gases vented from the calciner (calciner dust) are dissolved together in an aqueous medium, usually an aqueous sodium carbonate solution from previous operation, to obtain a substantially saturated solution of sodium carbonate at a temperature in the order of about 175° to 220° F., preferably in the order of about 185° to 210° F. The sodium carbonate content of the dissolving solution will be at least about 20% or, more preferably, between about 27 and 32% by weight. The sensible heat of the calcined trona together with the heat of solution of the anhydrous sodium carbonate may cause the slurry to heat above its boiling point, so that additional make-up water is usually added to replace water lost through vaporization.

It is known that the content of soluble silicates in saturated aqueous solutions of calcined trona containing insoluble impurities can be substantially reduced by digesting the solution, preferably with agitation, at a temperature above about 160° F., preferably from 185° to 210° F., for time sufficient to lower soluble silicate content, preferably from about 30 minutes to 8 hours. The sodium carbonate liquor is then separated from insoluble inpurities and the sodium carbonate, usually in hydrated form, is obtained from the clarified solution by crystallization. The crystallized hydrated sodium carbonate so obtained is then heated to elevated temperature to transform it into anhydrous dense soda ash. The sodium carbonate liquor freed from hydrated sodium carbonate crystals is recycled to the operation.

As previously stated, during calcination of the crushed trona a part of the silica contained therein is converted to soluble silicates. If calcination is conducted at temperatures of about 300° to 360° F., the soda liquor obtained by dissolving the combined calciner discharge and calciner dust contains in the order of about 600 to 1,000 ppm $SiO_2$, basis $Na_2CO_3$. The concentration of soluble silicate may reach higher levels, in the order of about 6,000 to 10,000 ppm $SiO_2$, basis $Na_2CO_3$ in the recycled mother liquor of the following evaporative crystallization step. In order to avoid contamination of product crystals, part of the crystallization liquor is purged, resulting in loss of soda values and pollution of the environment. High concentrations of silicate in the process liquors also contribute to formation of analcite ($NaAl.Si_2O_6.H_2O$) scale on process equipment.

Our investigation has shown that the fine particle size fraction of the calcined trona having particle size of less than about 60 mesh, preferably less than about 100 mesh (Tyler) contains a higher amount of soluble silicates than the coarse particle size fraction of the calcined trona discharged from the calciner having particle size larger than about 60 mesh. Our investigation has further shown that, even though on dissolution the fine particle size fraction gives high initial concentrations of dissolved silicate in the liquor, these initially high concentrations of silicates decrease to low levels when the solution is digested at temperatures above about 160° F., desirably at temperatures in the order of 160° to 300° F., preferably 180° to 210° F. in the presence of the insoluble portion contained in the fine particle fraction calcined trona. Digestion at temperatures above about 215° to 220° F., depending on liquor concentration, would require use of superatmospheric pressure vessels, and is for that reason not ordinarily preferred. If the solution of the fine particle fraction calcined trona is first subjected to clarification to remove the insoluble portion, and the resultant clear solution is then digested at elevated temperature, no significant reduction in amount of soluble silicates is observed. The coarse particle fraction of the calcined trona on dissolution gives much lower initial levels of soluble silicate, which also is reduced on digestion of the liquor at elevated temperature in the presence of the insoluble portion, but reduction in the level of soluble silicate is not nearly as large as it is in the case of digestion of the fine particle size fraction in the presence of the insoluble portion.

It is believed that, to some extent, the effectiveness of the insoluble portion in reducing soluble silicate levels in solutions of calcined trona on digestion at elevated temperature depends on the heat history of the calcined trona, e.g. time and temperature of calcination. However, we have found that in each instance the insolubles of the fine particle size fraction of any particular calciner run are more effective in reducing dissolved silicate levels in sodium carbonate solutions than the insolubles of the coarse particle size fraction of that calciner run.

Segregation of the calcined trona into a fine particle size fraction, having particle size substantially passing through 60 mesh screen, and a coarse particle size fraction having particle size being substantially retained on 60 mesh screen may be effected by any suitable means, e.g. screening, elutriation and the like. In usual operation, wherein crude mined trona reduced to particle size of less than about one-half inch is calcined in direct fired rotary calciners, the trona dust removed with the gases exiting the calciner, which usually amounts to about 20 to 30% by weight of the total calcined product, represents the preferrred fine particle size fraction. This dust usually has particle size of less than about 80 mesh.

In carrying out the process of the present invention, the segregated fine particle size and coarse particle size fractions of the calcined trona are separately dissolved in water or an unsaturated solution of sodium carbonate to produce essentially saturated sodium carbonate solutions. The insoluble portion is maintained in suspension by means of suitable agitation. The temperature of the solutions is desirably maintained in the range of about 160° to 300° F., preferably between about 185° to 210° F. by the sensible heat of the calcined trona, by heat of solution generated when the calcined trona is dissolved, by indirect heating or by any combination of the above. Maintaining the solution at elevated temperature, as indicated above, under agitation to maintain the insoluble portion in suspension is referred to herein as "digestion". Digestion is carried out for time sufficient to effect reduction of soluble silicate to desired level, usually for a period of between about 0.5 to 8 hours. Following digestion, the sodium carbonate solutions are subjected to clarification, as by settlement, centrifugation, elutriation, filtration or the like to remove the insoluble portion to obtain a clarified sodium cabonate solution, low in soluble silicates, from which sodium carbonate may then be recovered, as by crystallization. The digest liquor of fine particle size fraction calcined trona, without added insolubles from a previous operation, may contain in the order of about 8 to 12% by weight, usually 9 to 10% by weight of insolubles, basis $Na_2CO_3$. In preferred operation, insolubles obtained from a previous digestion step of fine particle size fraction calcined trona are recycled to the digestion step of the fine particle size fraction calcined trona of a subsequent operation. Preferably, in the digestion step the combined amount of insoluble portion contained in the fine particle size fraction of the calcined trona, together with the recycled portion of insolubles obtained from previous operation is maintained at from about 15 to 40% by weight, basis $Na_2CO_3$, more preferably from about 20 to about 30% by weight, basis $Na_2CO_3$.

If desired, excess amounts of insoluble portion obtained from the digestion of fine particle size fraction calcined trona may be used for digesting solution of coarse particle size portion calcined trona to aid in reduction of soluble silicates therein. Under that mode of operation, a part of the insoluble portion obtained from the digestion step of fine particle size fraction calcined trona is recycled to a subsequent digestion step of fine particle size fraction, while the remaining part of the insoluble portion obtained therefrom is added to the digestion step of coarse particle size fraction calcined trona, wherefrom it is separated in subsequent clarification operation and is then discarded, as is shown in the diagrammatical flow diagram of the attached drawing.

The following Examples illustrate practice of the present invention.

EXAMPLE 1

A stainless steel beaker equipped with stirrer and cover, immersed in an oil bath maintained at 90° C. with thermostatic control, was charged with 1,080 ml. of deionized water. When the temperature of the water reached about 75° C., 466 g. of fine particle size fraction calcined trona (passing through 80 mesh screen), which had been segregated from trona calcined at temperature of about 200° C., were added to the water. The calcined trona contained about 9% by weight of water-insolubles. Dissolution of the calcined trona in the water resulted in a 27% $Na_2CO_3$ solution containing about 3% by weight of insolubles. Dissolution caused the solution to heat to 90° C. As soon as the solution had reached that temperature, 50 ml. samples of the solution were withdrawn at timed intervals. Samples so withdrawn were filtered through 0.22 $\mu$ milipore filter into a 50 ml. portion of water for determination of dissolved silicate by photometric procedure. For high silicate levels (greater than 5000 ppm) the samples were acidified to pH 1.4, and ammonium molybdate was added to form the yellow complex. The absorbance was read at 410 $\mu$, and the silicate concentrations were determined based on appropriate standard curves. For lower silicate levels (less than 5000 ppm) the yellow ammonium molybdate complex was reduced with 1-amino-2-naphthol-4-sulfonic acid to form molybdenum blue, the absorbance of which was measured at 660 m$\mu$. Table I below shows the results obtained:

TABLE I

| Digestion Time | $SiO_2$, ppm (basis $Na_2CO_3$) |
|---|---|
| 15 min. | 2430 |
| 45 min. | 2300 |
| 2 hr. | 1550 |
| 4 hr. | 570 |
| 5 hr. | 350 |

EXPERIMENT 1

The procedure of Example 1 was repeated, using the coarse particle fraction calcined trona (being retained on 60 mesh screen), having insoluble content of about 15% by weight which, when dissolved in water to give an approximately 27% by weight $Na_2CO_3$ solution, resulted in insoluble content of the slurry of about 5% by weight. Reduction of insoluble silicates on digestion of that coarse particle fraction is summarized below in Table II.

TABLE II

| Digestion Time | $SiO_2$, ppm (basis $Na_2CO_3$) |
|---|---|
| 10 min. | 665 |
| 20 min. | 660 |
| 40 min. | 675 |
| 1 hr. | 695 |
| 2 hr. | 645 |
| 4 hr. | 520 |
| 6 hr. | 425 |

As the data in the above Tables show, the silicate level in the liquor obtained from the fine particle size fraction calcined trona was reduced by about 85% after 5 hours' digestion time, whereas in the solution of the coarse particle size fraction there was only about 36% reduction after 6 hours, even though the slurry density was higher than in the fine particle fraction solution.

The effect of added insolubles obtained from solution of fine particle size fraction calcined trona of a previous operation in the digestion step of the fine particle size fraction calcined trona in subsequent operation is shown in Examples 2 and 3 below.

EXAMPLE 2

Insolubles were obtained by digesting a fine particle size fraction calcined trona slurry for about 2 hours. The trona had been calcined at about 400° F., and the particle size portion had particle size 96% passing through 80 mesh (Tyler). The insolubles were filtered off and the wet cake was added to a fresh fine particle size fraction calcined trona liquor slurry obtained as described in Example 1, above, to give a total slurry density of about 6% by weight. The solution containing added insolubles was digested as shown in Example 1. The reduction of soluble silicate in the liquor on digestion is shown in Table III.

TABLE III

| Digestion Time | $SiO_2$, ppm (basis $Na_2CO_3$) |
|---|---|
| 15 min. | 1345 |
| 45 min. | 970 |
| 2 hr. | 560 |
| 4 hr. | 276 |

Comparing the data in Table III with those in Table I, it is seen that the 15 minutes value of 1,345 ppm $SiO_2$ obtained in Example 2 is considerably lower than the value of 2,430 ppm obtained after the same time in Example 1. Furthermore, after digestion for 4 hours, the solution of Example 2 containing added insolubles is reduced to much lower silicate level than that obtained in the solution of Example 1 containing no added insolubles.

EXAMPLE 3

Example 2 was repeated but adding insolubles obtained from a previous operation were added to give a total liquor slurry density of 12%. Results are summarized in Table IV below:

TABLE IV

| Digestion Time | $SiO_2$, ppm (basis $Na_2CO_3$) |
| --- | --- |
| 15 min. | 1070 |
| 45 min. | 545 |
| 2 hr. | 232 |
| 4 hr. | 206 |
| 5 hr. | 210 |

Example 3 further illustrates the beneficial effects of addition of insolubles obtained on digestion of fine particle fraction calcined trona in previous operation to the digestion of such fine particle portion in a subsequent operation.

Since various changes may be made in carrying out the process of our invention without departing its scope and essential characteristics, it is intended that all matter contained in the above description shall be interpreted as illustrative only and not in a limiting sense.

We claim:

1. In the process of making sodium carbonate from trona by crushing the trona, calcining the crushed trona, dissolving the calcined trona comprising sodium carbonate, insoluble impurities and soluble silicates in an aqueous medium, followed by separation of insoluble impurities to obtain a sodium carbonate solution, the improvement which comprises:
   a. segregating the calcined trona into a coarse particle size fraction and a fine particle size fraction;
   b. separately dissolving the coarse and the fine particle size fractions in aqueous media to obtain solutions comprising sodium carbonate, soluble silicates and insoluble impurities; and
   c. digesting the aqueous sodium carbonate solution obtained from the fine particle size fraction at a temperature above about 160° F. for time sufficient to insolubilize soluble silicates, and separating the digested solution from insoluble impurities.

2. The improvement of claim 1 with the additional steps of adding to the solution of fine particle size fraction calcined trona for the digestion step insoluble impurities which have been separated from a solution of fine particle size fraction in a previous operation.

3. The improvement of claim 2 wherein soluble impurities segregated from a solution of fine particle size fraction in a previous operation are added to the solution of fine particle size fraction calcined trona in amount sufficient to establish insolubles concentration in such solution containing added insolubles of from about 15 to about 40% by weight, basis the $Na_2CO_3$.

4. The improvement of claim 3 wherein the trona had been calcined at temperature between about 250° and 400° F., and wherein the fine particle size fraction calcined trona substantially passes through 60 mesh screen (Tyler).

5. The improvement of claim 4 wherein the fine particle size fraction calcined trona comprises calciner dust.

6. The improvement of claim 2 wherein the fine particle size fraction calcined trona comprises calciner dust.

7. The improvement of claim 2 wherein the trona had been calcined at temperature between about 250° and 400° F., and wherein the fine particle size fraction calcined trona substantially passes through 60 mesh screen (Tyler).

8. The improvement of claim 1 wherein the fine particle size fraction calcined trona substantially passes through 60 mesh screen (Tyler).

9. The improvement of claim 8 wherein the trona had been calcined at temperature between about 250° and 400° F.

10. The improvement of claim 9 wherein the fine particle size fraction calcined trona comprises calciner dust.

11. The improvement of claim 8 wherein the fine particle size fraction calcined trona comprises calciner dust.

12. The improvement of claim 1 with the additional step of adding to the solution of coarse particle size fraction calcined trona insoluble impurities which have been separated from a solution of said fine particle size fraction calcined trona and digesting said solution of coarse particle size fraction calcined trona containing such added insoluble impurities at temperature above about 160° F. for time sufficient to insolubilize soluble silicates and separating the digested solution from insoluble impurities.

13. The improvement of claim 12 wherein the trona had been calcined at temperature between about 250° and 400° F.

14. The improvement of claim 12 wherein the fine particle size fraction calcined trona comprises calciner dust.

15. The improvement of claim 1 comprising the steps of:
   a. segregating the calcined trona into a coarse particle size fraction being substantially retained on 60 mesh screen (Tyler) and a fine particle size fraction substantially passing through 60 mesh (Tyler);
   b. separately dissolving the coarse and the fine particle size fractions in aqueous media comprising sodium carbonate to obtain solution comprising sodium carbonate, soluble silicates and insoluble impurities;
   c. adding to the solution of fine particle fraction insoluble impurities which had been separated from a solution of fine particle size fraction in a previous operation in amount sufficient to establish insolubles concentration in said solution containing added insolubles of about 15 to about 40% by weight, basis the $Na_2CO_3$;
   d. digesting the aqueous sodium carbonate solution obtained from the fine particle size fraction containing the added insoluble impurities at a temperature within the range of 160° and 220° F. for time sufficient to insolubilize soluble silicates, separating the digested solution from insoluble impurities, and obtaining separated insoluble impurities to step (c).

16. The improvement of claim 15 wherein the fine particle size fraction calcined trona comprises calciner dust.

17. The improvement of claim 1 wherein the trona had been calcined at temperature between about 250° and 400° F.

* * * * *